United States Patent [19]

Schmidt

[11] Patent Number: 4,535,462

[45] Date of Patent: Aug. 13, 1985

[54] AUTOMATIC VELOCITY CONTROLLED DELAY CIRCUIT

[75] Inventor: Jimmy Q. Schmidt, Baltimore, Md.

[73] Assignee: The United States of America as represented by the Secretary of the Army, Washington, D.C.

[21] Appl. No.: 465,733

[22] Filed: Feb. 11, 1983

[51] Int. Cl.³ .......................... G01P 3/64; G06M 3/02
[52] U.S. Cl. ......................................... 377/2; 377/42; 377/23; 324/178
[58] Field of Search ................... 324/178, 179; 377/2, 377/42, 20, 23, 52; 250/322

[56] References Cited

U.S. PATENT DOCUMENTS

| | | | |
|---|---|---|---|
| 3,567,951 | 3/1971 | Montgomery et al. | 324/178 |
| 3,914,580 | 10/1975 | Watson et al. | 377/2 |
| 4,031,373 | 6/1977 | Beckwith | 324/178 |
| 4,228,397 | 10/1980 | Schmidt | 324/179 |
| 4,303,983 | 12/1981 | Chaborski | 377/20 |
| 4,385,227 | 5/1983 | Bridges | 377/20 |

Primary Examiner—John S. Heyman
Attorney, Agent, or Firm—Anthony T. Lane; Robert P. Gibson; Michael C. Sachs

[57] ABSTRACT

An automatic velocity delay circuit utilizes the output signal of a radio frequency velocimeter for determining the time a projectile takes to pass a sensor located at the muzzle end of a gun. The circuit uses this time interval pulse and clocking pulses to provide an X-ray trigger pulse at the precise instant that the projectile passes an X-ray head located at a selected position along a parallel path of projectile travel, thus insuring a photographic record of the projectile in the muzzle blast region.

3 Claims, 3 Drawing Figures

AUTOMATIC VELOCITY CONTROLLED DELAY CIRCUIT

GOVERNMENTAL INTEREST

The invention described herein may be manufactured, used and licensed by or for the Government for governmental purposes without the payment to me of any royalty thereon.

FIELD OF THE INVENTION

This invention is related to an automatic velocity controlled delay circuit which can be used to trigger auxiliary equipment during the time that a projectile is within the muzzle blast region of a gun.

BACKGROUND OF THE INVENTION

In the past, in ballistic research, it has been often required to observe a projectile immediately after launch from a gun tube, while the projectile is still in the muzzle blast region. X-ray photographs of the projectile in the blast region have permitted measurement of projectile structural integrity and measurement of initial velocity. One of the problems encountered in the past with X-ray photography has been the inability to trigger the X-ray equipment at the proper time to catch the projectile image on the X-ray plate while it is within the blast region.

One of the methods used for making velocity measurements was by use of microwave interferometry. In this method a microwave beam is directed down a gun tube. The microwave signal is reflected back from the projectile as it travels down the tube providing a longitudinal displacement and velocity measurement. The problem with this method was that due to ionized gases in the muzzle blast region, the microwave signal was often severely attenuated, causing signal dropout. At other times, there was sufficient gas blow-by to cause a loss of signal before projectile exit. This method is not suitable as a trigger mechanism.

In other instances high-speed photography has been used for the aforementioned purposes. However, the problem with this method was that in the blast region there is severe attenuation of visible light, thus limiting the view of the projectile and measurement of velocity only to the region beyond the blast region.

X-ray photography provides the best means to observe the projectile and measure the velocity in the blast region. However, the critical problem in the past has been to provide a triggering signal which is precise for different charges and different projectile configurations being tested. Frequently, because of the variable conditions, improper triggering results in the X-ray being triggered at the improper time, and failure to photograph the projectile.

Automatic X-ray trigger may be derived by the use of digital up-down counter circuits which count clock pulses "up" during the time it takes a projectile to pass from one light screen or break wire to another. After the projectile passes the second light screen or break wire, the counter counts "down". When the count reaches zero a pulse is generated to fire the X-ray. Assuming no great change in velocity, the projectile travels approximately the same distance during the count "down" as during the count "up" permitting X-ray heads to be positioned accordingly. The problem with the aforementioned prior art method is that the light screens or break wires must be positioned down range beyond the muzzle blast area. Since any X-ray photographs must be taken beyond the second screen, X-ray photographs of the projectile in the muzzle blast region are not possible.

PRIOR ART STATEMENT

A cursory review has been made of Radiant Energy, X-ray or Gamma Ray Source with Photographic Detector, with exposure control under class 250, subclass 322, and no disclosure has been found which may be considered significantly pertinent to the present invention.

SUMMARY OF THE INVENTION

The present automatic velocity controlled delay circuit is designed to provide an X-ray trigger at the precise instant that a projectile passes an X-ray head located in the muzzle blast region, thus insuring a photographic record of the projectile. The circuit provides the correct time delay regardless of the projectile velocity, because a real time measurement of the time interval is used to compute the delay.

A radio frequency velocimeter determines the time it takes for a projectile to pass a sensor mounted in the muzzle. The time is automatically fed to a programmable digital counter which counts pulses until the entered time from the velocimeter is reached. At this time the programmable counter outputs a pulse and begins the count again. Each time the correct number of clock pulses are counted, a pulse is generated. This pulse is amplified to a level sufficient to trigger the X-ray unit. Knowing the baseline length of the projectile, the X-ray heads can be spaced at multiples of this length and since the time between pulses is the time it takes for the projectile to travel one baseline length, a pulse is generated precisely at the time the projectile passes a selected length.

An object of the present invention is to provide an automatic velocity controlled delay circuit for triggering an X-ray head to photograph a projectile while it is within the muzzle blast region of a gun without the necessity of prior knowledge of the projectile velocity.

Another object of the present invention is to provide a triggering signal for an X-ray head for photographing a projectile in the blast region of a gun wherein the projectile length is used as a baseline distance for velocity measurement.

Another object of the present invention is to provide a triggering signal for photographing a projectile within a gun's muzzle blast region without the necessity of realignment of the triggering source or the X-ray head between firing of each round.

A further object of the present invention is to provide a triggering signal for other applications such as fuse setting where there is no restriction in the azimuth or elevation position of the gun.

For a better understanding of the present invention, together with other and further objects thereof, reference is made to the following descriptions taken in connection with the accompanying drawings.

DESCRIPTION OF THE SPECIFIC EMBODIMENTS

Figure 1:
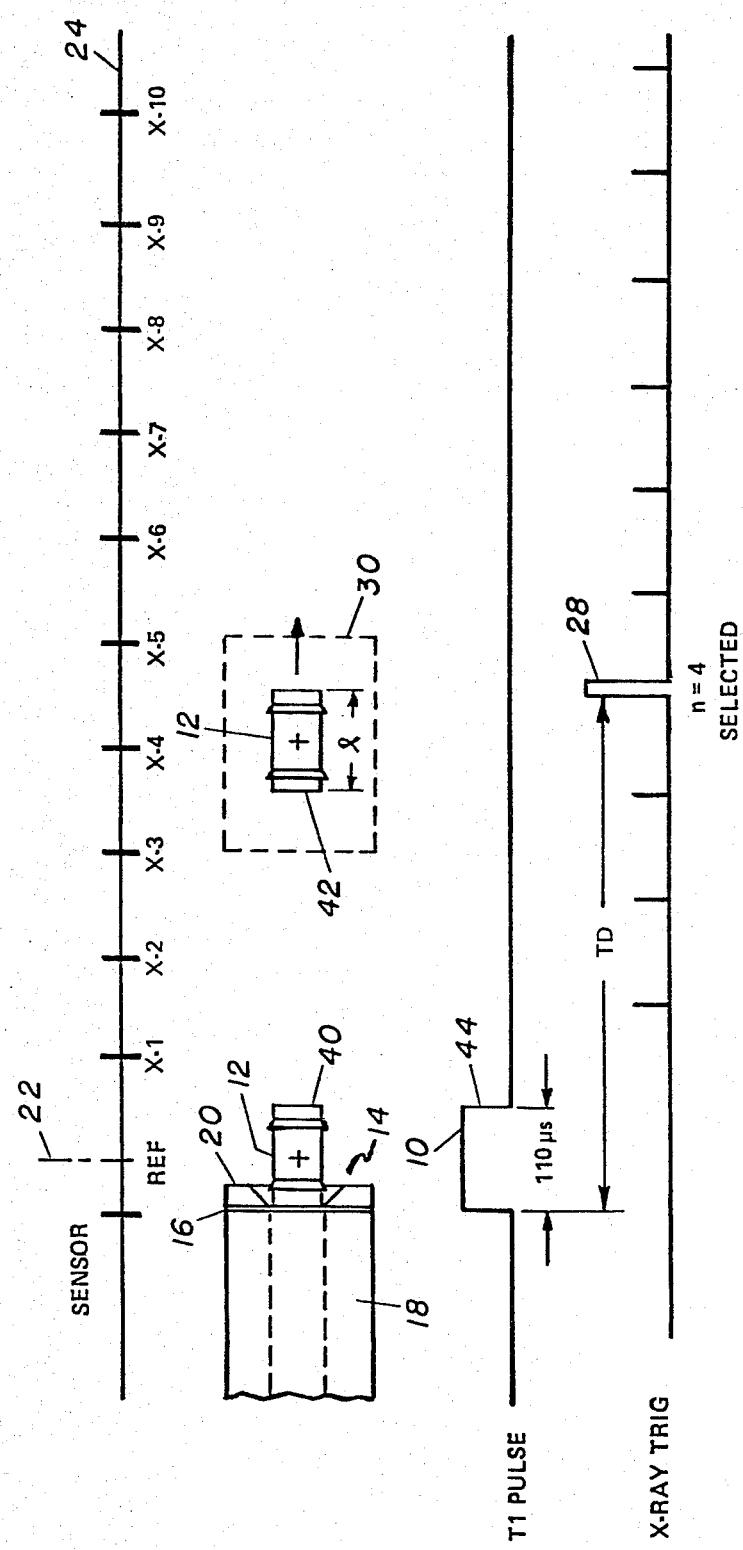
FIG. 1 is a schematic view of the time relationship of an X-ray trigger pulse generated by a projectile passing through a velocimeter to selected X-ray head positions.

Referring now to FIG. 1, the time interval TI pulse, 10 is generated by a projectile 12 as it passes through a velocimeter 14 such as described in U.S. Pat. No. 4,228,397. Velocimeter sensor coil 16 is fixedly held to the muzzle end of gun 18 by a collar 20. Since collar 20 is a significant thickness in relation to the length of the projectile 12, an X-ray photograph taken at this point would provide an image of projectile 12 which is partially obscured by collar 20. A reference point 22 is chosen along a parallel path 24 the projectile length of travel to be a half projectile length from the sensor position. The X-1 center position of the X-ray head is made equal to the projectile length "l". Each subsequent position of X-ray head location X-2 through X-n is made in increments of projectile length "l". If an X-ray photograph is taken at the time that the center of the projectile 12 is opposite X-1 position, the rear of the projectile 20 will have cleared the collar 20 by a distance 0.75 "l". The choice of the reference point 22 is arbitrary and can be made wherever it is desired.

Figure 3:
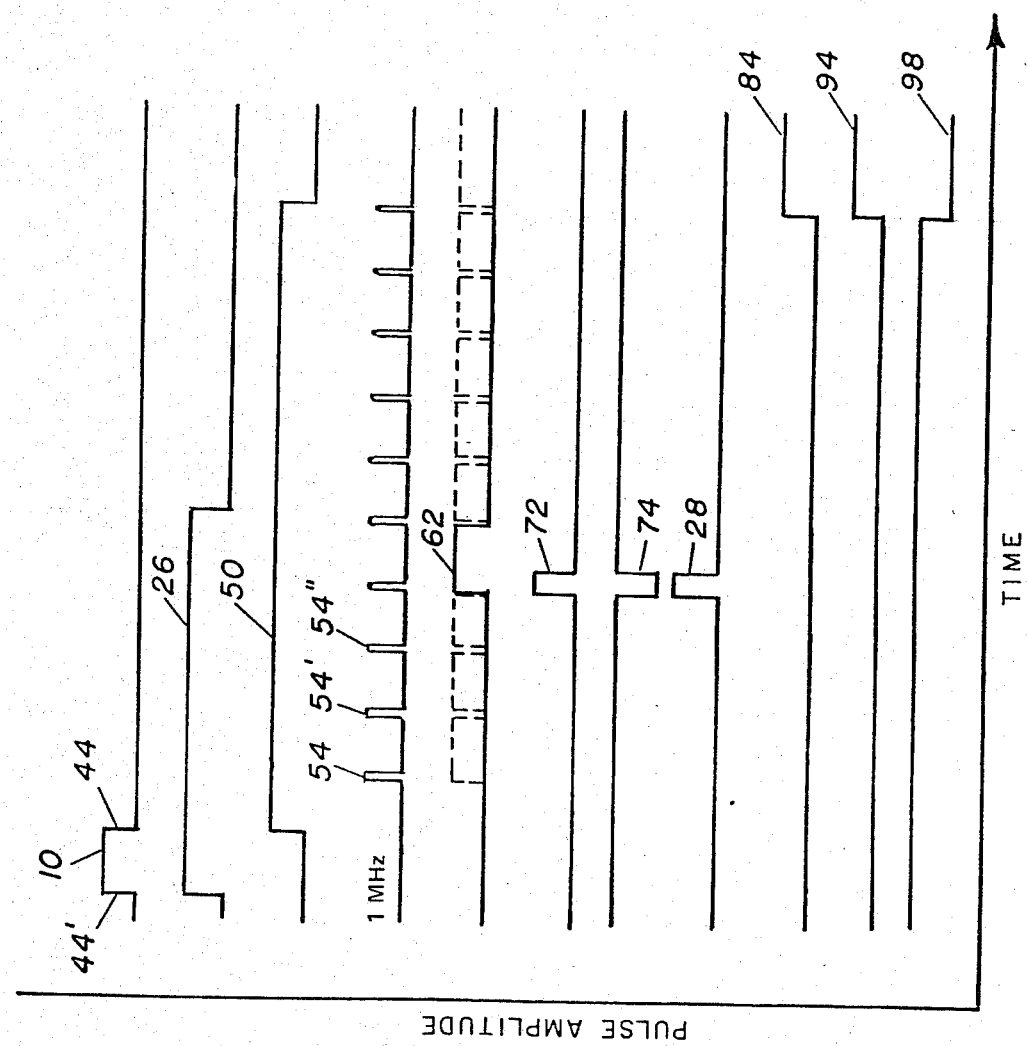
FIG. 3 shows the waveforms associated with the time delay circuit of FIG. 2 on the same time frame.

Referring now to FIGS. 1 and 3, if multiple X-ray heads are used and a precise reference fiducial recorded on an X-ray plate, projectile position in reference to the fiducial can be used to measure the change in velocity. The time delay (TD) from the front of the gun will be: $TD = TI + n(TI)$, where TI is the measured time interval of TI pulse 10, and n is the multiple of the baseline selected for triggering the X-ray head.

Figure 2:
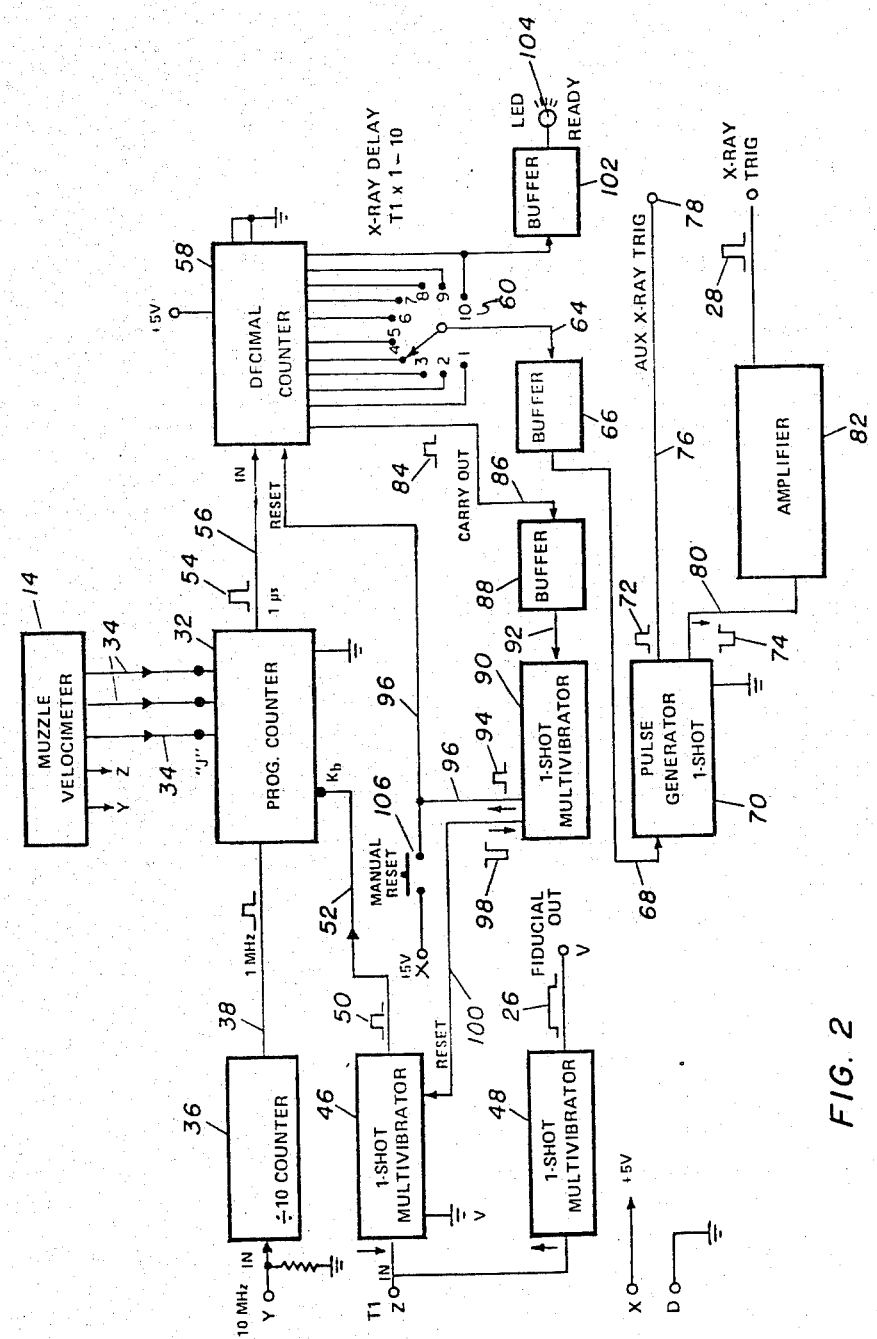
FIG. 2 is a block diagram of the automatic time delay circuit.

In the example shown in FIG. 1, the projectile 12 is to be photographed at n=4 and the TI is measured as 110 μs. The automatic delay of FIG. 2 provides an X-ray trigger pulse 28 after a delay of 550 μsec [$TD = 110 + 4(110)$] after the front of the projectile 12 has exited the gun tube 18. Had the projectile 12 velocity been faster, for instance, and a time interval TI of 100 μsec been obtained, the time delay TD would have been 500 μsec and the projectile would still have been photographed was aligned with the X-ray head, shown in outline by dash lines 30. Had the projectile velocity been slower, the correct time delay TD would also have been obtained.

Referring now to FIGS. 1-3, a programmable digital counter 32 is initially in the master preset mode wherein the "J" inputs are set to zero. The velocimeter 14 is electrically coupled to these "J" inputs via lines 34. A 10 MHz clock not shown, initiated by the velocimeter 14 is electrically coupled to decade counter 36 via the "Y" input terminal. Since the programmable counter 32, in this instance, has a maximum clock rate of less than 10 MHz, the pulses from the velocimeter "Y" output are divided by 10 in the decade counter 36 and fed via conducter 38 to a second input terminal of programmable digital counter 32 at a 1 MHz rate.

As the leading edge 40 of the projectile 12 passes the sensor 16, a positive going time interval pulse 10 is generated in velocimeter 14 causing a time interval counter, not shown, in the velocimeter 14 to count clock pulses. When the trailing edge 42 of the projectile 12 passes the sensor 16, the time interval pulse 10 in the velocimeter 14 is completed. The negative going trailing edge 44 of TI pulse 10 triggers a first one shot multivibrator 46 via a Z input terminal. The output of multivibrator 46 is a positive pulse 50 electrically coupled to a $K_b$ input terminal of the programmable counter 32 via conductor 52. The positive going leading edge 44' of TI pulse 10 triggers second multivibrator 48 which generates a fiducial output pulse 26. This pulse signal 50 causes the counter 32 to switch from the master preset mode to the count mode. The programmable counter 32 then counts the number of 1 MHz clock pulses until the count is the same as the time in microseconds that was entered into the "J" input. At this time programmable counter 32 generates a pulse 54 and begins to count again. Thus if 110 μsec is set in the "J" inputs from the velocimeter 14, every 110 μsec a pulse such as 54', 54" etc. would be generated. This train of pulses is fed via conductor 56 into a decimal counter 58 which counts pulses and puts out consecutive pulses 110 μsec apart on ten separate lines of rotary switch 60. The selected pulse 62, in this instance, n=4, is fed via line 64 through a first buffer 66 and the positive leading edge is used to trigger via conductor 68 a one-shot pulse generator 70. Pulse generator 70 produces a narrow (5 to 30 μsec) TTL level pulse 72 and negative TTL level pulse 74. The TTL level pulse 72 is fed via line 76 to an auxillary X-ray trigger output terminal 78. The negative TTL level pulse is coupled via line 80 to amplifier 82 which amplifies pulse 74 to a level of 22 volts which is sufficient to trigger an X-ray unit.

When the tenth pulse in the pulse train of the programmable counter 32 is counted by decimal counter 58, a carry out pulse 84 is sent from counter 58 via conductor 86 through second buffer 88 to trigger a third one-shot multivibrator 90 via line 92. A positive going output pulse 94 is used to reset the decimal counter 58 to zero via conductor 96. A negative going pulse 98 of the third multivibrator resets the first one shot multivibrator 46 via conductor 100, which, in turn resets the programmable counter 32 to the master preset mode for the next shot. The second multivibrator 48 is simply used to supply a timing fiducial signal. The third buffer 102 is used to drive a light emitting diode 104 to monitor the decimal counter 58 and be certain that it is properly reset after the initial power is applied. A manual reset normally open single pole switch 106 is serially connected to conductor 96 to provide an alternate means for resetting decimal counter 58. A DC voltage from terminal "X" is applied to the reset terminal of decimal counter 58 by the manual closing of switch 106.

Should it be desired to use multiple X-ray heads, it is simply a matter of connecting additional pulse generators similar to pulse generator 70 directly to the ten output lines of decimal counter 58.

In addition, if it is desired to take X-ray photographs at a greater distance than ten times the projectile baseline "l", additional decades can be achieved by increasing the division ratio of the divide-by-ten counter 36.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. In a system having a machine for X-raying a projectile in selected muzzle blast regions of a gun, an automatic velocity controlled delay circuit for triggering the X-raying, said circuit comprising: muzzle velocimeter means for generating a time interval, first pulse at a "Z" output terminal thereon, which analogously represents the sensed presence by the velocimeter means of the projectile in a selected blast region of the gun, and for generating clocking, second pulses at a "Y" output terminal thereon, and for generating digital decade, third signals equal in time duration, in microseconds to said time interval, first pulse duration;

divide counter means electrically coupled to said "Y" output terminal for generating a clocking, fourth pulse which is proportional to the number of said second clocking pulses received from said velocimeter means;

first multivibrator means electrically coupled to said "Z" output terminal for generating a positive output, fifth pulse when triggered by a negative trailing edge of said first pulse;

second multivibrator means electrically coupled to said "Z" output terminal for generating a positive output, sixth pulse having a leading edge which coincides in time with the sensed exiting by the velocimeter means of a front edge of said projectile as it exits said gun;

second digital counter means electrically coupled to the fourth pulse output of said divide counter means, and to said fifth pulse output of said first multivibrator means, and having "J" input terminals thereon for receiving said third signals of said velocimeter means, for switching from a master preset mode to a count mode upon receipt of said fifth pulse from said first multivibrator, and for counting the number of fourth pulses of said divide counter means until their duration is the same as the time in microseconds of said third signals, the number entered in said "J" input terminals; and decimal counter switching means including a decimal counter and a settable rotary switch means for generating a consecutive output, seventh pulse train wherein the seventh pulses are separated from each other an amount the same as the time duration of said third signals entering said second digital counter means, for providing an X-ray triggering output at discrete, eighth, time delays equal to the said third time interval pulse duration plus "n" times the said third time interval pulse duration, said rotary switch having a plurality of settable outputs for selection of eighth time delays as increments n of said third pulse duration;

means for amplifying the said X-ray triggering output of said switching means for providing a signal to trigger the X-ray machine in said system, including a first buffer circuit electrically coupled to a pole terminal of said rotary switch and a pulse generator electrically connected to the output of said first buffer circuit;

means for resetting said second digital counter means and said decimal counter switching means, including a second buffer circuit electrically coupled to a carry out terminal of said decimal counter to receive a carry out signal therefrom, and third multivibrator means electrically connected to the output of said second buffer means for providing a reset input signal to said first multivibrator means and to a reset terminal of said decimal counter switching means; and indicator means electrically connected to said decimal counter switching means for determining if it is properly reset after initial power is applied.

2. An automatic velocity controlled delay circuit as recited in claim 1 wherein said indicator means includes:

a third buffer circuit electrically coupled to the last of the outputs of said rotary switch means; and a light emitting diode electrically connected to the output of said third buffer circuit for indicating that the decimal counter switching means is properly reset after initial power is applied to said automatic velocity controlled delay circuit.

3. In a system having a machine for X-raying a projectile in selected muzzle blast regions of a gun, an automatic velocity controlled delay circuit for triggering the X-raying, said circuit comprising:

muzzle velocimeter means for generating a time interval, first pulse at a "Z" output terminal thereon, which analogously represents the sensed presence by the velocimeter means of the projectile in a selected blast region of the gun, and for generating clocking, second pulses at a "Y" output terminal thereon, and for generating digital decade, third signals equal in time duration, in microseconds to said time interval, first pulse duration;

divide counter means electrically coupled to said "Y" output terminal for generating a clocking, fourth pulse which is proportional to the number of said second clocking pulses received from said velocimeter means;

first multivibrator means electrically coupled to said "Z" output terminal for generating a positive output, fifth pulse when triggered by a negative trailing edge of said first pulse;

second multivibrator means electrically coupled to said "Z" output terminal for generating a positive output, sixth pulse having a leading edge which coincides in time with the sensed exiting by the velocimeter means of a front edge of said projectile as it exits said gun;

second digital counter means electrically coupled to the fourth pulse output of said divide counter means, and to said fifth pulse output of said first multivibrator means, and having "J" input terminals thereon for receiving said third signals of said velocimeter means, for switching from a master preset mode to a count mode upon receipt of said fifth pulse from said first multivibrator, and for counting the number of fourth pulses of said divide counter means until their duration is the same as the time in microseconds of said third signals, the number entered in said "J" input terminals; and decimal counter switching means including a decimal counter and a settable rotary switch means for generating a consecutive output, seventh pulse train wherein the seventh pulses are separated from each other an amount the same as the time duration of said third signals entering said second digital counter means, for providing an X-ray triggering output at discrete, eighth, time delays equal to the said third time interval pulse duration plus n times the said third time interval pulse duration, said rotary switch having a plurality of settable outputs for selection of eighth time delays as increments n of said third pulse duration;

means for amplifying the said X-ray triggering output of said switching means for providing a signal to trigger the X-ray machine in said system, means for resetting said second digital counter means and said decimal counter switching means, including a second buffer circuit electrically coupled to a carry out terminal of said decimal counter to receive a carry out signal therefrom, and third multivibrator means electrically connected to the output of said second buffer means for providing a reset input signal to said first multivibrator means and including a single pole normally open switch which electrically couples a DC supply voltage to a reset terminal of said decimal counter switching means; and indicator means electrically connected to said decimal counter switching means for determining if it is properly reset after initial power is applied.

* * * * *